(12) United States Patent
Shimakawa et al.

(10) Patent No.: US 7,275,987 B2
(45) Date of Patent: Oct. 2, 2007

(54) VIRTUAL WORLD SYSTEM, SERVER COMPUTER AND INFORMATION PROCESSOR

(75) Inventors: Keiso Shimakawa, Kanagawa (JP); Shuji Hiramatsu, Tokyo (JP); Masakazu Suzuoki, Tokyo (JP); Akio Ohba, Kanagawa (JP); Toyoshi Okada, Tokyo (JP); Shigeru Enomoto, Kanagawa (JP); Muneki Shimada, Tokyo (JP); Tomokazu Kake, Tokyo (JP); Yousuke Kimoto, Kanagawa (JP); Kenjiro Komaki, Tokyo (JP); Hiromasa Horie, Tokyo (JP); Takahiro Fujii, Tokyo (JP); Yuta Kimura, Tokyo (JP); Hidehisa Onai, Tokyo (JP)

(73) Assignee: Sony Computer Entertainment Inc. (JP)

( * ) Notice: Subject to any disclaimer, the term of this patent is extended or adjusted under 35 U.S.C. 154(b) by 862 days.

(21) Appl. No.: 09/976,519

(22) Filed: Oct. 12, 2001

(65) Prior Publication Data

US 2002/0095523 A1     Jul. 18, 2002

(30) Foreign Application Priority Data

Oct. 12, 2000 (JP) ............ P2000-312113
Oct. 10, 2001 (JP) ............ P2001-312764

(51) Int. Cl.
*A63F 3/00* (2006.01)
*G06F 3/048* (2006.01)
*G06F 9/455* (2006.01)

(52) U.S. Cl. ............ 463/9; 715/706; 715/738; 718/1; 707/100; 463/1; 463/30; 463/31

(58) Field of Classification Search ............ 463/1, 463/9, 30, 31; 715/706, 738; 718/1; 707/100
See application file for complete search history.

(56) References Cited

U.S. PATENT DOCUMENTS 5,802,296 A * 9/1998 Morse et al. ............ 709/208

(Continued)

FOREIGN PATENT DOCUMENTS

JP     11-249991 A     9/1999

(Continued)

OTHER PUBLICATIONS

A Study on Multi-user 3-D Virtual Space based on VRML, Yoshi Kawakami, Shigeki Yokoi and Takami Yasuda, Technical Report of IEICE, pp. 7-14, Oct. 1998.

Primary Examiner—Lewis A. Bullock, Jr.
(74) Attorney, Agent, or Firm—Lerner, David, Littenberg, Krumholz & Mentlik, LLP (57) ABSTRACT

Objects which are created in conformity with the data format of objects to be handled in a virtual world are offered to users on the terminal computers of the users independently of the virtual world. The users transmit the offered objects to a server computer which generates the virtual world, while the server computer stores these objects in association with the operators. Since these objects are recorded in a format which can be interpreted by the server computer for generating the virtual world, they can be handled in the virtual world in the same manner as the other objects which have been defined in the virtual world beforehand. Thus, the users are permitted to use in the virtual world objects which are different from the objects which were defined in the virtual world beforehand.

9 Claims, 5 Drawing Sheets

U.S. PATENT DOCUMENTS

| | | | |
|---|---|---|---|
| 6,009,458 A * | 12/1999 | Hawkins et al. | 709/203 |
| 6,009,460 A | 12/1999 | Ohno et al. | |
| 6,024,643 A * | 2/2000 | Begis | 463/42 |
| 6,102,406 A * | 8/2000 | Miles et al. | 273/430 |
| 6,119,229 A | 9/2000 | Martinez et al. | |
| 6,219,045 B1 * | 4/2001 | Leahy et al. | 715/757 |
| 6,349,301 B1 * | 2/2002 | Mitchell et al. | 707/101 |
| 6,476,830 B1 * | 11/2002 | Farmer et al. | 715/769 |
| 6,561,811 B2 * | 5/2003 | Rapoza et al. | 434/236 |
| 6,672,961 B1 * | 1/2004 | Uzun | 463/31 |
| 6,734,885 B1 * | 5/2004 | Matsuda | 715/848 |
| 6,746,332 B1 * | 6/2004 | Ing et al. | 463/42 |
| 6,749,432 B2 * | 6/2004 | French et al. | 434/247 |
| 6,753,857 B1 * | 6/2004 | Matsuura et al. | 345/419 |
| 6,954,728 B1 * | 10/2005 | Kusumoto et al. | 705/1 |

FOREIGN PATENT DOCUMENTS

| JP | 2000-157741 A | 6/2000 |
|---|---|---|
| JP | 2000-254353 A | 9/2000 |

* cited by examiner

OBJECT DATA FORMAT

50

| ITEM | VALUE |
|---|---|
| OBJECT ID | ... |
| APPELLATION | ... |
| ATTRIBUTE | ... |
| POSSESSOR | ... |
| SIZE | ... |
| CURRENT POSITION | ... |
| DISPLAYING IMAGE | ... |

501 — OBJECT ID
502 — APPELLATION
503 — ATTRIBUTE
504 — POSSESSOR
505 — SIZE
506 — CURRENT POSITION
507 — DISPLAYING IMAGE

VIRTUAL WORLD SYSTEM, SERVER COMPUTER AND INFORMATION PROCESSOR

CROSS-REFERENCE TO RELATED APPLICATIONS

The present application claims priority from Japanese Application Nos. 2000-312113 filed Oct. 12, 2000 and 2001-312764 filed Oct. 10, 2001.

BACKGROUND OF THE INVENTION

The present invention relates to a virtual world system in which a large number of users can virtually communicate with one another by utilizing a computer network.

A virtual world system of the type in which multiple users participate is known as one aspect of communications utilizing a computer network. This is a system wherein a virtual world is generated in a server computer, characters who are the avatars of the users are caused to appear in the virtual world, and the characters are permitted to perform various actions, such as movements and conversations, through user operations. Besides, the situations of the virtual world, the character who is a subject for the operation of each user, and the characters who are operated by the other participant users are displayed within the display screen of a terminal computer which is used by each user participating in the virtual world system, whereby the users share an identical field, and virtual communications are realized.

SUMMARY OF THE INVENTION

In general, in a virtual world system of the multiple-user participation type, characters who are the avatars of users can possess objects in a virtual world. By way of example, the character to whom the role of a warrior is cast possesses a weapon in the virtual world, and the character to whom the role of a merchant is cast possesses an article of commerce. In this manner, diversity is given to the characters in the virtual world, whereby a virtual society full of variety can be formed.

However, the objects which the characters can possess in the virtual world have been limited to ones defined in the virtual world beforehand, and the participant users have inevitably selected from among the predefined objects, objects such as items possessed by the characters who are the avatars of the users. This has caused, for example, a situation where many of the characters possess similar items. If such a restriction is removed so that the characters can possess items peculiar to the users, the virtual world system will become more amusing and more enjoyable to the users.

An object of the present invention is to provide a virtual world system in which users can use objects other than ones defined in the virtual world beforehand.

In order to accomplish the object, the present invention provides a virtual world system including a server computer, and a plurality of terminal computers connected to the server computer, wherein avatars of operators of the terminal computers are displayed in a virtual world generated on the server computer, and are caused to act on the basis of operations from the terminal computers. The system further includes object offer means for offering virtual objects to the operators of the terminal computers; object transmission means for transmitting the virtual objects from the terminal computers to the server computer; object storage means for receiving the virtual objects, and for storing the virtual objects in association with the operators of the terminal computers having transmitted the virtual objects; and object display means for displaying the stored virtual objects in the virtual world on the basis of operations of the operators.

In addition, the present invention provides a server computer including virtual world generation means for generating a virtual world, and for outputting symbols to act in the virtual world to participant terminals in accordance with operations from the participant terminals;

an object record area for storing object data concerning objects available in the virtual world, the object data being stored in conformity with a predetermined data format;

object display means for displaying the objects in the virtual world by reference to the object record area; and object data acceptance means for accepting from the participants the object data recorded in the predetermined data format, and for recording the accepted object data in the object record area.

Further, the present invention provides an information processor, including game means for playing a game which presents a problem to a player, and which awards a virtual object to the player when the problem has been solved, the virtual object being recorded in a predetermined data format; and transmission means for transmitting the awarded virtual object to a server computer operable to generate a virtual world.

Still further, the present invention provides a recording medium recorded with a program for controlling an information processor, the program including causing the information processor to execute a game which presents a problem to a player and which awards a virtual object to the player when the problem has been solved, the virtual object being recorded in a predetermined data format; and causing the information processor to execute a transmission process for transmitting the awarded virtual object to a server computer operable to generate a virtual world.

The present invention also provides a recording medium recorded with a program for controlling an information processor, the program including accepting operations from an operator and creating a virtual object in response to at least one of the operations; recording the virtual object in conformity with a predetermined data format; and transmitting the recorded virtual object to a server computer operable to generate a virtual world.

Further still, the present invention provides a method of providing a virtual world in a system including a server computer and a plurality of terminal computers connected to the server computer. The method includes generating a virtual world on the server computer; offering virtual objects to operators of the terminal computers; transmitting the virtual objects from the terminal computers to the server computer in response to operations by the operators of the terminal computers; storing the transmitted virtual objects in association with the operators of the terminal computers having transmitted the virtual objects; and displaying the stored virtual objects in the virtual world based on operations by the operators of the terminal computers.

Additionally, the present invention provides a method of providing a virtual world in a system including a server computer and a plurality of terminal computers connected to the server computer, the method including generating a virtual world on the server computer; transmitting object data regarding objects available in the virtual world from the terminal computers to the server computer in response to operations by operators of the terminal computers; storing the object data in association with the terminal computer from which the object data was transmitted, the object data being stored in conformity with a predetermined data format; and displaying the objects represented by the stored object data in the virtual world based on operations by the operators of the terminal computers.

DETAILED DESCRIPTION

An embodiment of the present invention will be described in detail with reference to the drawings. In this example, there will be exemplified the mode in which a virtual world is generated on a server computer, and in which, using a terminal computer, each user plays a game permitting him/her to acquire an item and participates in the virtual world while carrying the item acquired in the game.

Figure 1:
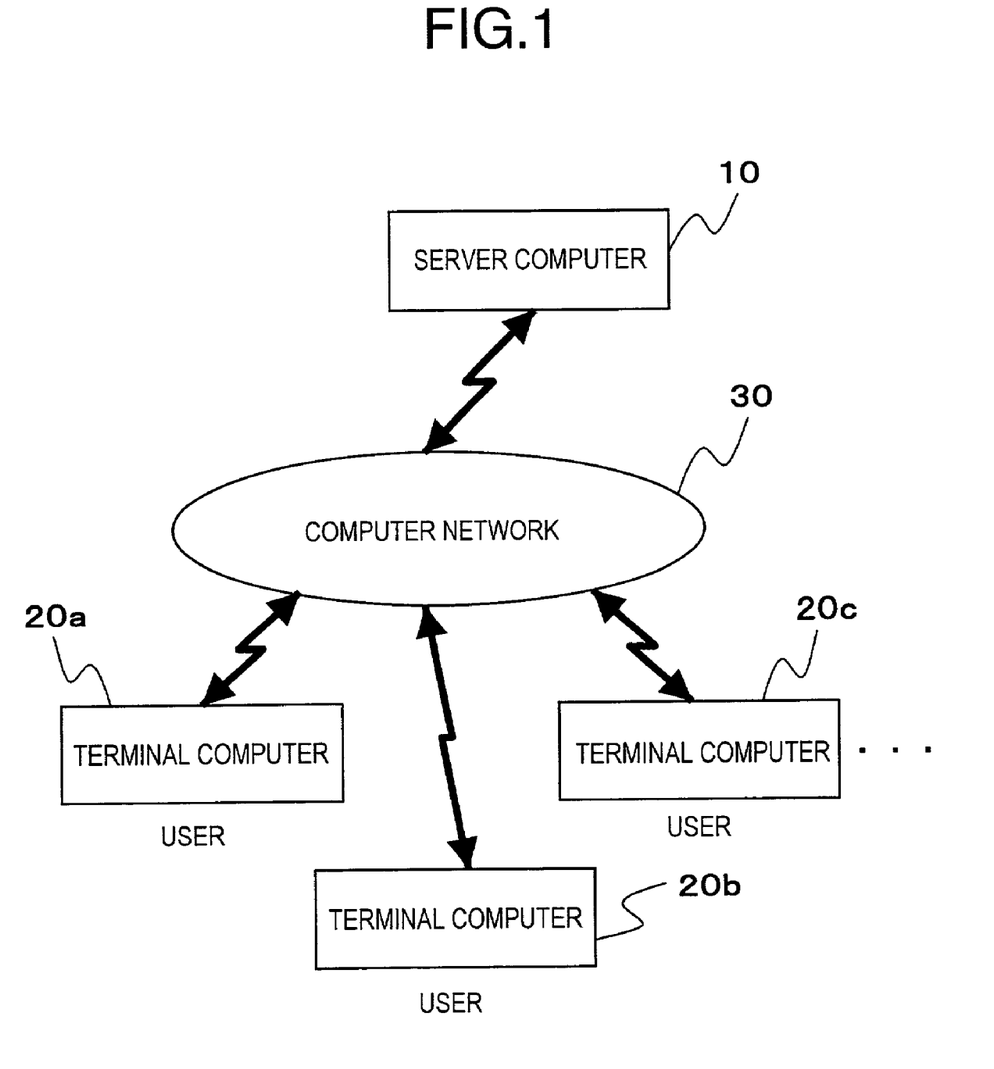
FIG. 1 is a block diagram for explaining the outline of the construction of an embodiment of the present invention.

FIG. 1 is a block diagram showing the outline of the construction of this embodiment. As shown in the figure, this embodiment is so constructed that a plurality of terminal computers 20a, 20b, 20c are connected to a server computer 10 through a network 30 such as the Internet.

Users access the server computer 10 by using the respective terminal computers 20, whereby they can participate in a virtual world generated on the server computer 10. The virtual world is displayed on the display screens of the terminal computers 20 of the users participating in the virtual world, and also the avatars of the respective participant users are displayed as characters.

The actions of the character who is the avatar of each user in the virtual world are determined by operations which the user has performed on his/her own terminal computer 20, and the actions of the character are reflected also on the display screens of the terminal computers 20 of the other users.

In this embodiment, each character in the virtual world is capable of using items, such as a car and a telephone, in the virtual world, in addition to performing actions such as movement and conversation. Also, the state of use of the item is displayed on the terminal computer 20 of the user pertinent to the character using the item, and the situation of the use is also displayed on the terminal computers of the users pertinent to the other characters.

Further, in this example, not only the items predefined and available in the virtual world, but also any item acquired in a game separate from the virtual world by each user, can be utilized in the virtual world.

Figure 2:
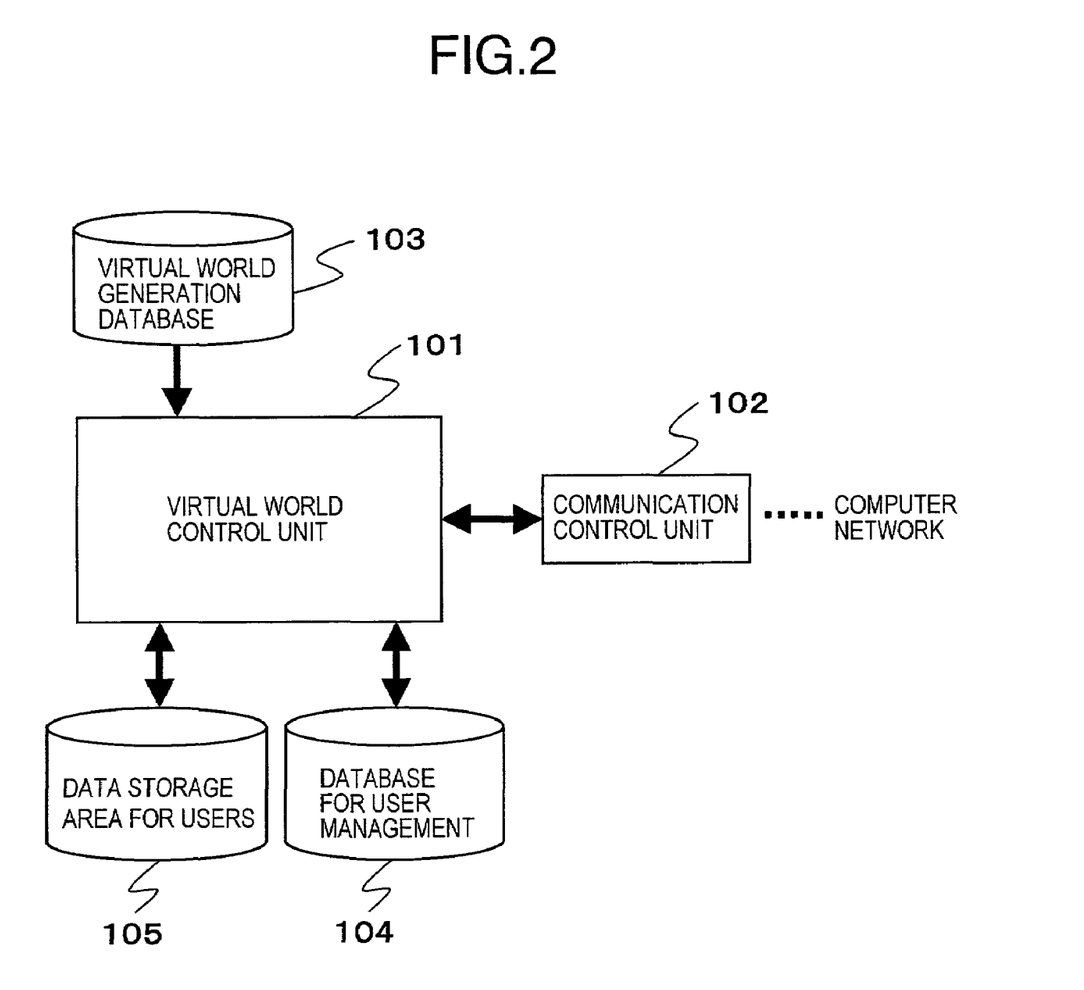
FIG. 2 is a block diagram for explaining the functional architecture of a server computer.

FIG. 2 is a block diagram for explaining the functional architecture of the server computer 10 in FIG. 1. As shown in FIG. 2, the server computer 10 includes a virtual world control unit 101, a communication control unit 102, a virtual world generation database 103, a database for user management 104, and a data storage area for users 105.

Incidentally, the server computer 10 can be built by employing an information processor, such as a server computer or a personal computer, which has a general architecture including a central processing unit (CPU); a main storage device; an auxiliary storage device such as a hard disk drive; a reader for reading data from a portable storage medium such as a CD-ROM or DVD-ROM; an input device such as a keyboard or mouse; a display device such as a monitor; a communication device for communicating with the terminal computers 20, etc. through the Internet; and an interface for governing data transmission/reception among the constituents mentioned above.

The virtual world control unit 101 loads object data concerning topography, buildings and the like objects in the virtual world from the virtual world generation database 103 so as to generate the virtual world on the server computer 10, and it broadcasts the virtual world through the communication control unit 102 to the terminal computers 20 accessing this server computer 10, whereby the users of the respective terminal computers 20 are permitted to participate in the virtual world.

In addition, the virtual world control unit 101 generates data for displaying the actions, etc. of the characters based on the operations of the respective users by employing character displaying data, item displaying data, etc. recorded in the virtual world generation database 103. Then, it broadcasts the generated data through the communication control unit 102 to the respective terminal computers 20 participating in the virtual world.

Figure 3:
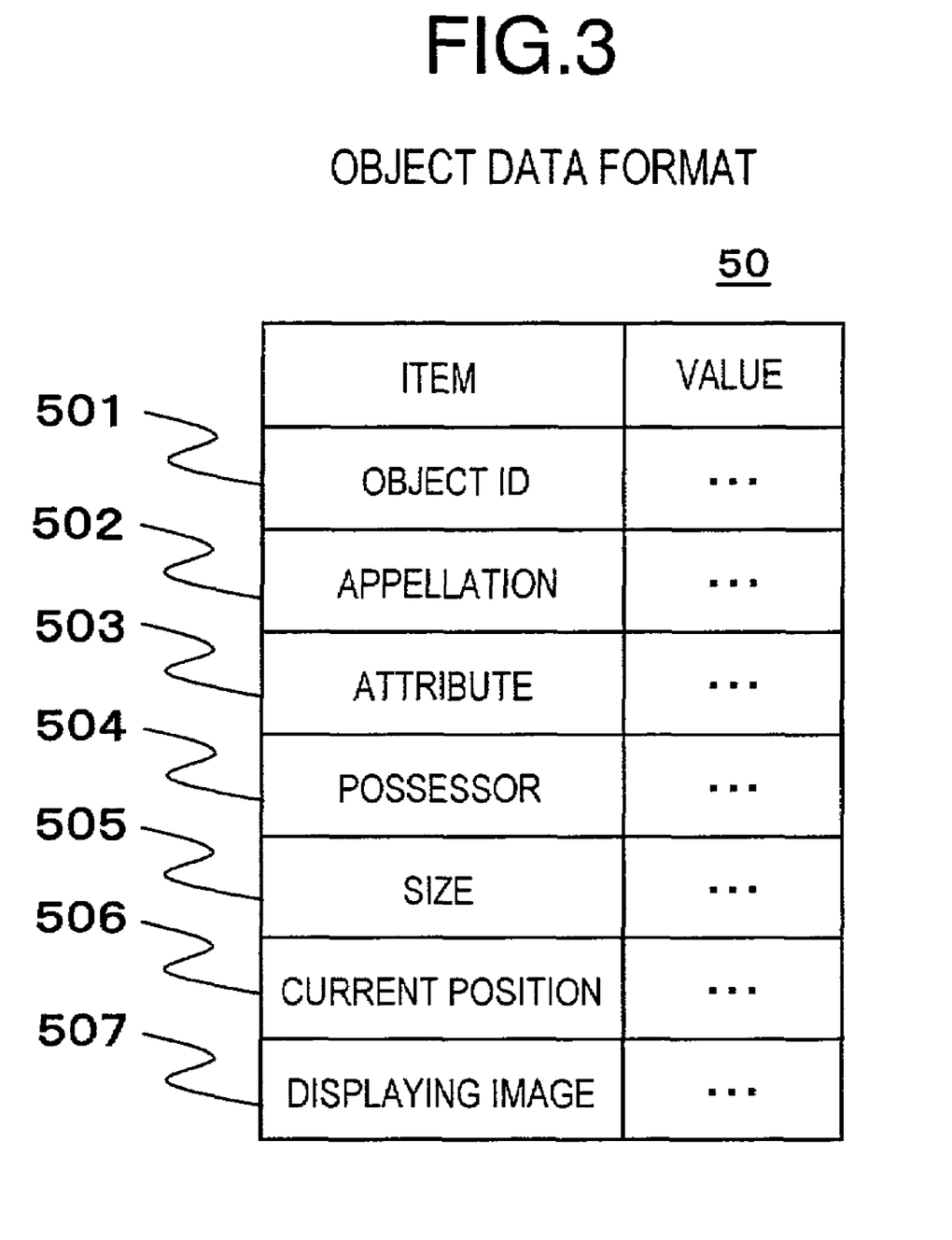
FIG. 3 is a diagram showing an example of the format of object data which is stored in a virtual world generation database.

Here, the virtual world generation database 103 is a database in which the object data concerning topography, buildings and the like objects in the virtual world, and the object data concerning the characters, items, etc., are stored as stated above. The object data stored in the virtual world generation database 103 can be described in a format 50 as shown in FIG. 3 by way of example.

Referring to the figure, the object data format 50 has items and values corresponding to the items, and it includes an object ID 501, an appellation 502, an attribute 503, a possessor 504, a size 505, a current position 506 and a displaying image 507 as the items.

The object ID 501 is a code for identifying the particular object. The virtual world control unit 101 manages the action, etc. of the object, for example a character, on the basis of the code.

The appellation 502 is the appellation of the particular object. By way of example, in a case where the object is a character, it is possible for the user to give the character his/her favorite appellation. Also, when the object is a building in the virtual world, it is possible that an appellation is given to the building beforehand.

The attribute 503 can be set as, for example, the character, car or building, and it expresses the category of the particular object. The property of the object in the virtual world, for example, the movability of the object or the contents of the operation which the user can perform for the object, is determined by the value of the attribute 503.

The possessor 504 expresses the possessor of the particular object. In a case where the object is an item such as a portable telephone, the possessor of the item can be specified, and information on the possessor is determined by this item. By way of example, when the particular object is in the possession of any specified user, a user ID to be explained later can be set as the value of the possessor 504. Of course, possessors are not specified for some objects.

The size 505 expresses the size of the particular object in the virtual world. Each object is displayed on the display devices of the terminal computers 20 with sizes which are proportional to the value specified by the size 505.

The current position 506 expresses the current position of the particular object in the virtual world. The position of the object in the virtual world can be specified by, for example, two-dimensional or three-dimensional coordinate values. In a case where the object moves, the value of this item is updated every predetermined interval.

The displaying image 507 is image data for causing the display devices of the terminal computers 20 to display the particular object. Since the virtual world is usually displayed in three-dimensional fashion, the displaying image 507 is recorded as image data having information for three dimensions. Besides, in a case where the object has a movable property, data from which the images of respective states are created (for example, a state where the object is walking, and a state where the object carries something) are also recorded.

The virtual world control unit 101 loads the object data recorded in the format explained above so as to display the particular object in the virtual world on the basis of the displaying image 507 and to determine the property of the object on the basis of the attribute.

Furthermore, insofar as object data is recorded in the foregoing format, the virtual world control unit 101 can interpret the object data recorded in a data storage area other than that of the virtual world database 103, and can handle it in the same fashion as the object data recorded in the virtual world database 103.

Incidentally, the data concerning topography, buildings and the like objects in the virtual world may well be held in the respective terminal computers 20 beforehand. In this case, a CD-ROM or the like recording medium in which the data concerning topography, buildings and the like objects in the virtual world are recorded may be previously distributed to each user who is to participate in the virtual world, or the data may be previously broadcast to each user by utilizing a communication channel or the like, and the terminal computer 20 displays the virtual world on its display device by reference to the previously distributed data. Also, the virtual world control unit 101 may broadcast the data concerning the characters to act in the virtual world, the items or the like, to the terminal computers 20.

The communication control unit 102 controls the communication device, and processes various protocols required for the server computer 10 to communicate with the terminal computers 20, etc.

The database for user management 104 manages the IDs and passwords of the users who participate in the virtual world. More specifically, in this example, in order to participate in the virtual world, each user needs to enter a user registration in the server computer 10 beforehand. The virtual world control unit 101 prompts the user having accessed the server computer 10 to input his/her ID and password. Subsequently, it collates the input ID and password by reference to the database for user management 104, and it authorizes the authenticated user to participate in the virtual world.

The data storage area for users 105 is a storage area which is given to the users having finished the user registration. A dedicated storage area of predetermined size in the data storage area for users 105 is allotted to each user. The storage area allotted to the user can be identified with, for example, the user ID as a key.

By way of example, data concerning an item which the user has obtained in a game played through the terminal computer can be recorded in the data storage area for users 105. If the format of the data concerning the item conforms to the object data format 50 explained above, the virtual world control unit 101 can cause this item to appear in the virtual world by reference to the data recorded in the data storage area for users 105.

Figure 4:
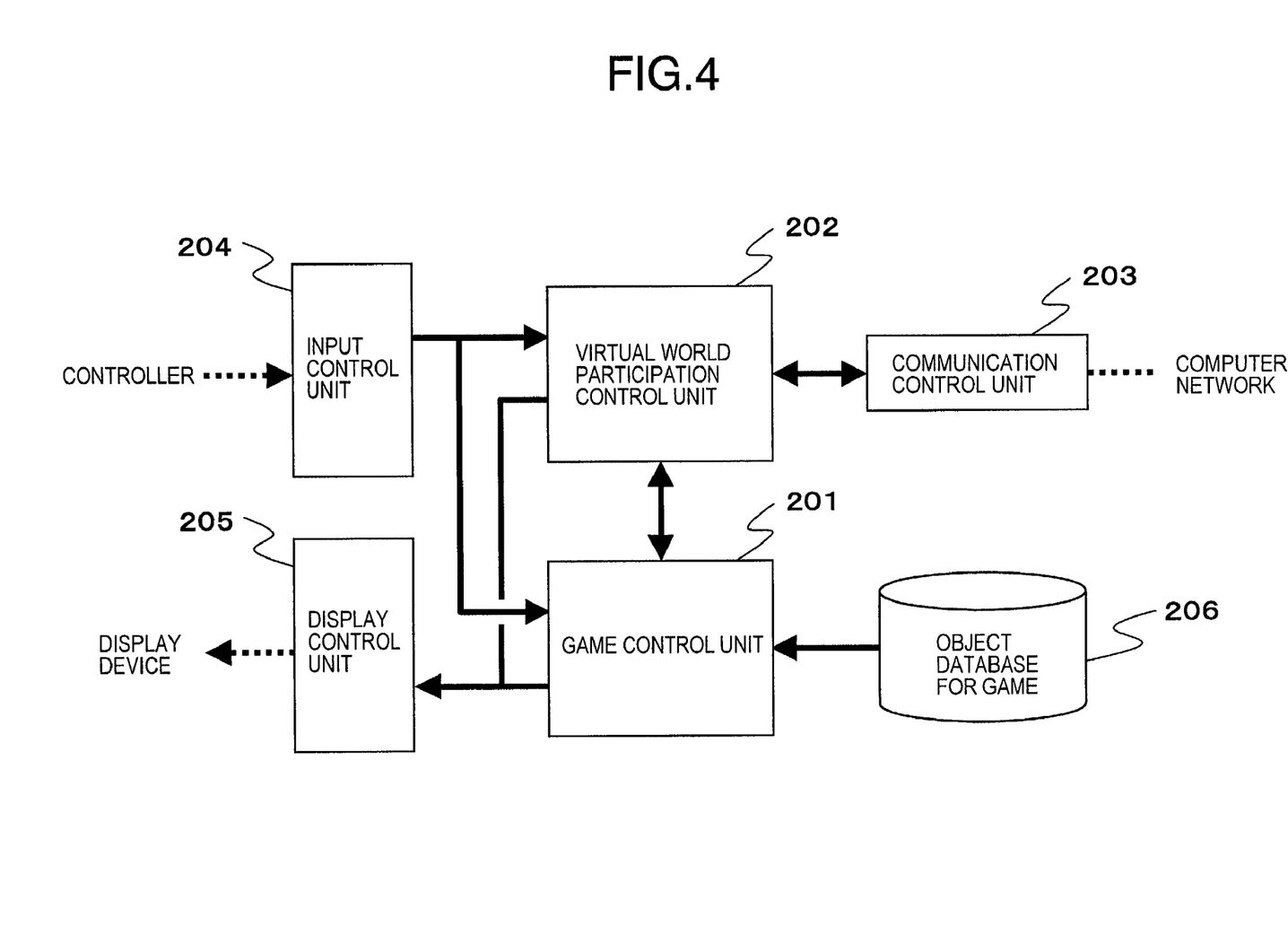
FIG. 4 is a block diagram for explaining the functional architecture of a terminal computer.

FIG. 4 is a block diagram for explaining the functional architecture of the terminal computer 20 in FIG. 1. As shown in FIG. 4, the terminal computer 20 includes a game control unit 201, a virtual world participation control unit 202, a communication control unit 203, an input control unit 204, a display control unit 205, and an object database for a game 206.

Incidentally, the terminal computer 10 can be built by employing an information processor, such as a personal computer or an entertainment apparatus, which has a general architecture including a central processing unit (CPU); a main storage device; an external storage device such as a hard disk drive; a reader for reading data from a portable storage medium such as a CD-ROM or DVD-ROM; an input device such as a controller, keyboard or mouse; a display device such as a monitor; a communication device for communicating with the server computers 10, etc. through the Internet; and an interface for governing data transmission/reception among the constituents mentioned above.

The game control unit 201 is implemented in such a way that a game program stored in the portable storage medium, such as a CD-ROM or DVD-ROM, a game program obtained through the communication device, or the like is loaded into the main storage device, and the CPU runs the program.

The game which is offered by the game control unit 201 need not be associated with the virtual world generated on the server computer 10, but it can be executed on the terminal computer 20 independently. Besides, the genre and contents of the game are as desired.

In this example, the game offered by the game control unit 201 is assumed to be a racing game. The user operates the input device, such as a controller, to operate a racing car displayed on a display screen and to play a race.

The racing car or the like object which appears in the racing game is displayed on the display screen of the display device through the display control unit 205 in such a way that the game control unit 201 loads object data from the object database for a game 206.

Here, the object data in the object database for a game 206 are data stored in the portable storage medium, such as the CD-ROM or DVD-ROM, or data stored in the storage device, such as a hard disk. The game control unit 201 loads the data and causes the display device to display them through the display control unit 205 as may be needed.

Some or all of the object data recorded in the object database for a game 206 are recorded in conformity with the object data format 50 of the virtual world as exemplified in FIG. 3.

The virtual world participation control unit 202 is implemented in such a way that a program stored in the portable storage medium, such as the CD-ROM or DVD-ROM, a program obtained through the communication device, or the like is loaded into the main storage device, and the CPU runs the program.

The virtual world participation control unit 202 communicates with the virtual world control unit 101 of the server computer 10 through the communication control unit 203, and it receives data for generating the virtual world and causes the display device of the terminal computer 20 to display the image of the virtual world through the display control unit 205, while it transmits the operations the user requested through the input control unit 204 to the virtual world control unit 101.

The communication control unit 203 controls the communication device, and processes various protocols required for the terminal computer 20 to communicate with the server computer 10, etc.

The input control unit 204 has the interface function of accepting the operations of the user through the input device, such as a controller or keyboard, and transferring the operation contents to the game control unit 201 as well as the virtual world participation control unit 202.

The display control unit 205 generates display screen data by subjecting the screen data delivered from the game control unit 201 as well as the virtual world participation control unit 202 to a composition process, etc. The generated display screen data are output to the display device, and the display device having received the data displays an image on the display screen in accordance with the display screen data.

Figure 5:
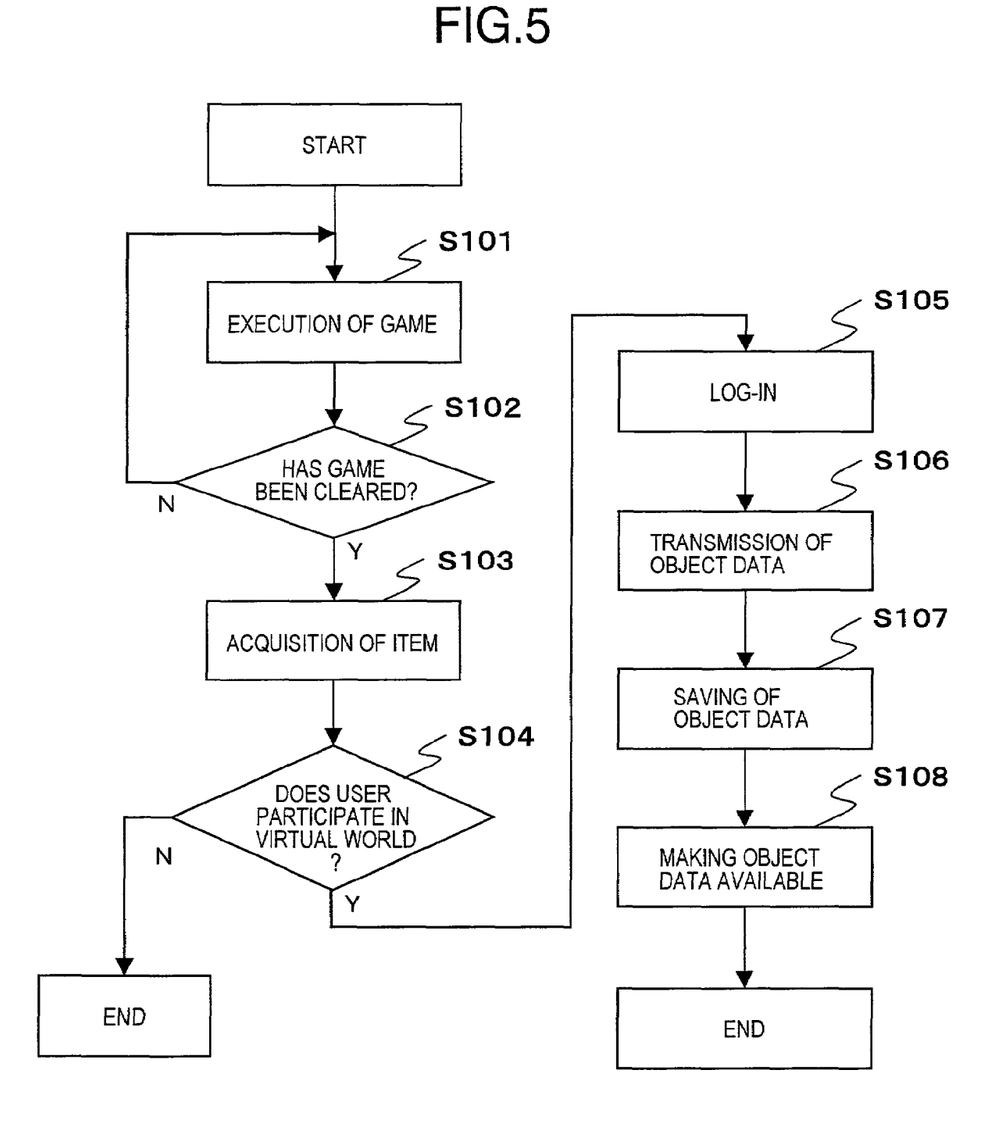
FIG. 5 is a flow chart for explaining the flow of processing steps in the embodiment of FIG. 1.

Next, the processing steps of this embodiment will be described with reference to FIG. 5.

The user having completed the user registration for the virtual world with the server computer 10 plays the game by using the terminal computer 20 (S101). As above, a racing game will be used as an example of the game.

In this game, when the user has fulfilled a predetermined condition, for example, becoming coming in first in a race imposed in the racing game, he/she is determined to have solved the race (S102), and an original racing car is given to the user (S103). The user is then permitted to use the racing car in subsequent races.

Object data concerning the racing car is stored in the object database for a game 206 beforehand, and the game control unit 201 brings the object data into a status available to the user on condition that the user has solved the race. The object data is recorded in conformity with the predetermined object data format 50 which the virtual world control unit 101 can interpret. However, it may be recorded in any format which is alterable to the object data format 50.

In a case where the user wants to bring the acquired racing car to the virtual world (S104), he/she accesses the server computer 10 by utilizing the virtual world participation control unit 202. Subsequently, the user participates in the virtual world by inputting his/her user ID and password in a log-in step (S105).

Thereafter, the user saves the object data concerning the obtained racing car in his/her own area of the data storage area for users 105 (S106, S107). By way of example, the user can save the object data in his/her own area of the data storage area for users 105 in such a way that a command menu for object transmission is prepared in the virtual world participation control unit 202 beforehand, such that the user selects the menu and designates an object to-be-transmitted. By the way, in a case where the racing car is recorded in a format alterable to the object data format 50 as explained above, the object data has its format converted into the object data format 50 before being saved in the data storage area for users 105.

On this occasion, the attribute 503 is set to be a car, and the possessor 504 is set to be the user recorded in the area for users 105. Also, image data recorded in the object database for a game 206 in the racing game is recorded in the displaying image 507.

Then, the virtual world control unit 101 can interpret the object data recorded in the data storage area for users 105, and cause the object to appear in the virtual world (S108). A display image at this time can be generated by reference to the displaying image 507 of the object data concerning the racing car which is recorded as stated above. Thus, the image of the racing car can be displayed on the terminal computers 10 of the other users. Furthermore, the virtual world control unit 101 recognizes that the object is a car by reference to the attribute, and it implements the function of the car in the virtual world. The car can travel in the virtual world while carrying the character of the user on the basis of the user operation. Since the possessor is specified, any user other than the pertinent user having acquired the racing car in the game can be prevented from operating the car.

In this way, the users are permitted to use in the virtual world objects other than those objects defined in the virtual world beforehand.

Incidentally, the present invention is not restricted to the embodiment described above, but it is capable of various modifications within the scope of the subject matter hereof.

By way of example, although an example has been described for the case in which a user brings an item acquired in the game to the virtual world, it is also allowed that the user creates an object conforming to the object data format of the virtual world by himself/herself by utilizing, for example, item creating application software, and that he/she transmits the created object to the server computer 10 so as to save it in the data storage area for users 105. In this manner, original items of the respective users can be brought to the virtual world.

Moreover, the objects which are brought to the virtual world are not restricted to items, but characters themselves may be brought to the virtual world as well. By way of example, the game to be executed on the terminal computer 10 may be a role-playing game, and when the game is solved, the object data of the character who is in charge of the user can be saved in the data storage area for users 105 of the server computer 10.

As described above, according to the present invention, users are permitted to use in a virtual world objects which are other than objects defined in the virtual world beforehand.

What is claimed is:

1. A virtual world system, comprising:
    a server computer;
    a plurality of terminal computers connected to said server computer, wherein avatars of operators of said plurality of terminal computers are displayed in a virtual world generated on said server computer, and are caused to act on the basis of operations by the operators of said plurality of terminal computers, each of said plurality of terminal computers being operable to award an object having a predetermined data format to the operator of said terminal computer to be controlled by the operations by the operator of said terminal computer when the operator solves a problem in an interactive game presented during execution of a first game program on said terminal computer, said first game program being executable independently from execution of a second program for displaying the object in the virtual world, each of said plurality of terminal computers including a control unit operable to permit the operator of said terminal computer to participate in said virtual world by transmitting information regarding the operations by the operator to said server computer and, under control of the operator of said terminal computer, transmitting the awarded object to said server computer under control of the operator to which the object is awarded, wherein said server computer includes an object storage unit operable to store a plurality of the objects transmitted from ones of said plurality of terminal computers in association with information identifying the operators of said ones of said plurality of terminal computers; and object display means operable to display the stored plurality of objects in the virtual world on said plurality of terminal computers on the basis of the operations by the operators identified by the stored identifying information, using the information regarding the operations received from said plurality of terminal computers.

2. A virtual world system as claimed in claim 1, wherein the object awarded during execution of the first game program is not defined in the virtual world prior to the execution of the first program.

3. A server computer, comprising:

an object record area operable to store object data concerning objects displayable in a virtual world, the object data being stored in conformity with a predetermined data format;

a virtual world control unit operable to generate the virtual world and to output object display information to participant terminals in communication with said server computer for controlling display of the objects in the virtual world on the participant terminals in accordance with operations by operators of the participant terminals;

a communication control unit operable to receive the object data and information regarding the operations by the operators from the participant terminals, the object data including objects awarded to operators of the participant terminals in response to the operators solving problems in interactive games presented during execution of first game programs on the participant terminals, the first game programs being executable independently from second programs executable to display the virtual world, the awarded objects being received from transmissions controlled by the operators to which the objects are awarded, wherein the object record area is operable to store the received object data in association with information identifying the operators of ones of the participant terminals having transmitted the object data, and the virtual world control unit is operable to output the object display information for display of the awarded objects using the object data stored in the object record area in accordance with the received information regarding the operations by the operators and the stored information identifying the operators.

4. An information processor, comprising:

a control unit operable to execute a game application to enable interactive game play by a player, and upon execution of the game application, to present a problem in an interactive game to the player and award an object to the player when the player solves the problem, the object having a predetermined data format, the control unit further being operable to execute a second application independently from executing the game application to display the object together with other items with which the object interacts in a virtual world facilitated by a server computer; and a communication control unit operable to transmit the object and information concerning operations by the player to the server computer in association with information identifying the player for incorporation of the object in the virtual world under control of the player to which the object is awarded and to receive from the server computer information for displaying the object together with the other items in accordance with the operations by the player.

5. A recording medium having information recorded thereon for performing a method of handling an object for incorporation in a virtual world and displaying the object, the method comprising:

executing a game application by an information processor to enable interactive game play by a player including presenting a problem to the player in an interactive game and awarding an object to the player by the interactive game when the player solves the problem, the awarded object having a predetermined data format;

under control by the player, transmitting the awarded object from the information processor to a server computer;

transmitting first information concerning first operations by the player from the information processor to the server computer;

incorporating the transmitted object in a virtual world generated by the server computer in accordance with the first information and second information regarding second operations by an operator of at least one other information processor in communication with the server computer; and executing a second application independently from said execution of the game application to display the awarded object at the information processor using information received from the server computer regarding the virtual world, wherein the information received from the server computer takes into account the first information and the second information.

6. A recording medium as claimed in claim 5, wherein said method further comprises:

permitting the player to access the server computer and to participate in the virtual world generated by the server computer, said step of executing the second application to display the awarded object including displaying at least a portion of the virtual world; and making the awarded object available for control by the player in the virtual world.

7. A recording medium as claimed in claim 6, wherein said method further comprises:

setting an attribute for the awarded object which is transmitted to the server computer; and determining a mode in which the operator uses the awarded object in the virtual world based on the attribute.

8. A virtual world system, comprising:

a server computer operable to generate a virtual world; and a plurality of participant terminals in communication with the server computer, each participant terminal including a terminal display unit operable to execute a first program to display an image including a plurality of objects of the virtual world and to enable an operator at the participant terminal to interact with the virtual world, an object providing unit operable to award an object having a predetermined format to the operator of the participant terminal to be controlled by the operations by the operator of the participant terminal when the operator solves a problem presented in an interactive game during execution of a second program on the terminal computer, the second program being executable independently from the first program, and a communication unit operable to transmit the awarded object to the server computer under control of the operator of the participant terminal to which the object is awarded, and the server computer including a storage unit operable to receive the transmitted object and to store the received object in association with information identifying the operator of the participant terminal from which the object was transmitted, and a server display unit operable to generate information for display of stored virtual objects in the virtual world by the participant terminals on the basis of operations by the operators identified by the stored identifying information, the operations being communicated from the participant terminals to the server computer, wherein the communication unit of each participant terminal is operable to receive the information generated by the server display unit, and the terminal display unit of each participant terminal is operable to generate the image using the information received from the server display unit.

9. A method of handling an object for incorporation in a virtual world and display of the object, comprising:

executing a game application by an information processor to enable interactive game play by a player including presenting a problem to the player in an interactive game and awarding an object to the player by the interactive game when the player solves the problem, the awarded object having a predetermined data format;

under control by the player, transmitting the awarded object from the information processor to a server computer;

transmitting first information concerning first operations by the player from the information processor to the server computer;

incorporating the transmitted object in a virtual world generated by the server computer in accordance with the first information and second information regarding second operations by an operator of at least one other information processor in communication with the server computer; and executing a second application independently from said execution of the game application to display the awarded object at the information processor using information received from the server computer regarding the virtual world, wherein the information received from the server computer takes into account the first information and the second information.

* * * * *